United States Patent
Han et al.

(10) Patent No.: US 7,684,439 B2
(45) Date of Patent: Mar. 23, 2010

(54) APPARATUS AND METHOD FOR TRANSMITTING DATA IN A COMMUNICATION SYSTEM

(75) Inventors: Ki-Tae Han, Seoul (KR); Sun-Ny Chang, Suwon-si (KR); Yun-Sang Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1126 days.

(21) Appl. No.: 11/314,306

(22) Filed: Dec. 21, 2005

(65) Prior Publication Data

US 2006/0133424 A1 Jun. 22, 2006

(30) Foreign Application Priority Data

Dec. 21, 2004 (KR) .................. 10-2004-0109937

(51) Int. Cl.
*H04J 3/24* (2006.01)
(52) U.S. Cl. ........................ 370/474; 370/394
(58) Field of Classification Search ............. 370/389, 370/394, 412, 471, 474
See application file for complete search history.

(56) References Cited

U.S. PATENT DOCUMENTS 5,809,024 A * 9/1998 Ferguson et al. ....... 370/395.53
6,799,232 B1 * 9/2004 Wang ........................ 710/65
2004/0153588 A1 8/2004 Kasper
2005/0068900 A1 * 3/2005 Stephens et al. ............ 370/252
2005/0135426 A1 * 6/2005 Francoeur et al. .......... 370/474

FOREIGN PATENT DOCUMENTS

| CN | 1178051 | 4/1998 |
|----|---------|--------|
| CN | 1398094 | 2/2003 |
| JP | 06-125365 | 5/1994 |
| JP | 06-244902 | 9/1994 |
| JP | 2000-194655 | 7/2000 |
| JP | 2003-134043 | 5/2003 |
| JP | 2003-319014 | 11/2003 |
| WO | WO 03/042782 | 5/2003 |
| WO | WO 2004/043011 | 5/2004 |

* cited by examiner

Primary Examiner—Ricky Ngo
Assistant Examiner—Kan Yuen
(74) Attorney, Agent, or Firm—The Farrell Law Firm, LLP

(57) ABSTRACT

An apparatus and method transmits data in a communication system. A buffer descriptor (BD) generator generates a BD making reference to constituent elements constituting a MAC protocol data unit (PDU), if there is a medium access control (MAC) service data unit (SDU) to be transmitted. A direct memory access (DMA) controller generates the MAC PDU from the MAC SDU according to the BD.

4 Claims, 11 Drawing Sheets

APPARATUS AND METHOD FOR TRANSMITTING DATA IN A COMMUNICATION SYSTEM

PRIORITY

This application claims the benefit under 35 U.S.C. § 119(a) to an application entitled "Apparatus and Method for Transmitting Data in a Communication System" filed in the Korean Intellectual Property Office on Dec. 21, 2004 and assigned Serial No. 2004-109937, the contents of which are incorporated herein by reference.

BACKGROUND OF THE INVENTION

1. Field of the Invention

The present invention generally relates to an apparatus and method for transmitting data in a communication system.

2. Description of the Related Art

FIG. 1 is a diagram illustrating a configuration of a conventional communication system.

Referring to FIG. 1, the communication system has a multicell configuration, i.e., has a cell 100 and a cell 150. The communication system includes a base station (BS) 110 for controlling the cell 100, a BS 140 for controlling the cell 150, and mobile stations (MSs) 111, 113, 130, 151 and 153. Each of the MSs 111, 113, 130, 151 and 153 has a protocol stack configuration including a Medium Access Control (MAC) layer and a Physical (PHY) layer.

The MS protocol stack configuration for a conventional communication system will now be described with reference to FIG. 2.

FIG. 2 is a diagram illustrating an MS protocol stack configuration for a conventional communication system.

Referring to FIG. 2, the MS protocol stack includes an upper layer 210, a MAC layer 220 and a PHY layer 230. The MAC layer 220 includes a service-specific Convergence Sublayer (CS) 221 and a MAC Common Part Sublayer (CPS) 223. When transmission packet data from the upper layer 210 is input to the MAC layer 220, the CS 221 of the MAC layer 220 converts the packet data received from the upper layer 210 into a MAC Service Data Unit (SDU), and transmits the MAC SDU to the MAC CPS 223. The MAC CPS 223 converts the MAC SDU received from the CS 221 into a MAC Protocol Data Unit (PDU), and transmits the MAC PDU to the PHY layer 230.

When the MAC SDU is converted into the MAC PDU, the MAC SDU's size can be either larger or smaller than a size of the MAC PDU, defined to be suitable to be transmitted in the communication system. Therefore, in a process of generating the MAC PDU, a packing or fragmentation operation can be performed. A description thereof will now be made with reference to FIGS. 3 and 4.

FIG. 3 is a diagram illustrating a conventional MAC SDU packing operation for generating a MAC PDU.

Referring to FIG. 3, when a transmission MAC SDU is smaller than a MAC PDU, a packet operation should be performed such that plural MAC SDUs is included in one MAC PDU. That is, the packing operation generates one MAC PDU by concatenating multiple MAC SDUs. When the MAC SDUs concatenated into one MAC PDU are different from each other in size, a packing subheader (PSH) must be inserted into (or added to) the head of each of the MAC SDUs packed into one MAC PDU. In FIG. 3, two MAC SDUs (i.e., MAC SDU#1 311 and a MAC SDU#2 313) are packed into one MAC PDU 315, by way of example.

FIG. 4 is a diagram illustrating a conventional MAC SDU fragmentation operation for generating MAC PDUs.

Referring to FIG. 4, when a transmission MAC SDU is larger than a MAC PDU, a fragmentation operation should be performed such that one MAC SDU is fragmented into multiple MAC PDUs. That is, the fragmentation operation fragments one MAC SDU into multiple MAC PDUs. In this case, a fragmentation subheader (FSH) must be inserted into (or added to) the head of each of the MAC PDUs fragmented from one MAC SDU. In FIG. 4, one MAC SDU 411 is fragmented into two MAC PDUs of a MAC PDU#1 413 and a MAC PDU#2 415, by way of example.

A format of a MAC PDU generated by packing multiple MAC SDUs will now be described with reference to FIG. 5.

FIG. 5 is a diagram illustrating a format of a MAC PDU generated by packing multiple MAC SDUs.

Referring to FIG. 5, the MAC PDU includes a generic MAC header (GMH) 511, a subheader (SH) 513, a PSH 515, a MAC SDU 517, a PSH 519, a MAC SDU 521, and a Cyclic Redundancy Check (CRC) 523. The GMH 511 is a header having a predetermined length of, for example, 6 bytes. Although the MAC PDU shown in FIG. 5 includes only one SH 513, the MAC PDU may include a plurality of SHs.

The PSH is inserted into the head of each of multiple MAC SDUs packed into one MAC PDU 500, when the multiple MAC SDUs are packed into one MAC PDU as described with reference to FIG. 3. In FIG. 5, two MAC SDUs of a MAC SDU 517 and a MAC SDU 521 are packed into one MAC PDU 500, by way of example. The PSH 515 and the PSH 519 are inserted into the heads of the MAC SDU 517 and the MAC SDU 521, respectively. The CRC 523 is inserted to check whether there is an error in the MAC PDU 500.

A format of a MAC PDU generated by fragmenting one MAC SDU will now be described with reference to FIG. 6.

FIG. 6 is a diagram illustrating a format of a MAC PDU 600 generated by fragmenting one MAC SDU.

Referring to FIG. 6, the MAC PDU 600 includes a GMH 611, an SH 613, an FSH 615, a MAC SDU 617, and a CRC 619. The GMH 611 is a header having a predetermined length of, for example, 6 bytes. Although the MAC PDU 600 shown in FIG. 6 includes only one SH 613, the MAC PDU may include a plurality of SHs. The FSH 615 is inserted into the head of the MAC SDU 617 fragmented into MAC PDUs, when one MAC SDU is fragmented into multiple MAC PDUs as described with reference to FIG. 4. The CRC 619 is inserted to check whether there is an error in the MAC PDU 600.

An operation of generating a MAC PDU by the MAC CPS 223 will now be described with reference to FIG. 7.

FIG. 7 is a diagram illustrating an operation of generating a MAC PDU by the MAC CPS 223 of FIG. 2.

Referring to FIG. 7, in order to generate a MAC PDU, the MAC CPS 223 must copy MAC SDUs located in different positions. The MAC CPS 223 performs memory copying from a MAC SDU memory 711 to a MAC PDU memory 713 to generate a MAC PDU in application software 710.

MAC CPS 223 copying the memory to the MAC PDU memory 713, after inserting an appropriate GMH or SH in consisting of MAC PDU into copied MAC SDU, generates MAC PDU to deliver to PHY layer. The MAC CPS 223 performs memory copying to a MAC PDU memory 721 in hardware 720 to transmit the MAC PDU generated in the MAC PDU memory 713 through a PHY layer 230. As a result, the PHY layer 230 can transmit MAC PDUs in the MAC PDU memory 721.

In order to generate a MAC PDU from a MAC SDU and actually transmit the MAC PDU at the PHY layer as described above, memory copying should be performed two times: memory copying in software and memory copying in hardware. The double memory copying is inefficient and increases a time required for transmitting the MAC PDU.

SUMMARY OF THE INVENTION

It is, therefore, an object of the present invention to provide an apparatus and method for transmitting data in a communication system.

It is another object of the present invention to provide an apparatus and method for generating a MAC PDU without memory copying and transmitting the MAC PDU in a communication system.

According to one aspect of the present invention, there is provided an apparatus for transmitting data in a communication system. The apparatus includes a buffer descriptor (BD) generator for generating a BD referencing constituent elements constituting second type data, if there is first type data to be transmitted; and a direct memory access (DMA) controller for generating the second type data from the first type data according to the BD.

According to another aspect of the present invention, there is provided an apparatus for transmitting data in a communication system. The apparatus includes a buffer descriptor (BD) generator for detecting information indicating that a burst for transmitting data over a frame at a start point of the frame is allocated, and upon detecting a need for transmitting a medium access control (MAC) service data unit (SDU) in the frame, generating a BD corresponding to elements of a MAC protocol data unit (PDU); and a direct memory access (DMA) controller for generating the MAC PDU from the MAC SDU according to the BD.

According to further another aspect of the present invention, there is provided a method for transmitting data in a communication system. The method includes generating a buffer descriptor (BD) corresponding to constituent elements included in second type data, if there is first type data to be transmitted; and generating the second type data from the first type data according to the BD.

According to yet another aspect of the present invention, there is provided a method for transmitting data in a communication system. The method includes detecting information indicating that a burst for transmitting data over a frame at a start point of the frame is allocated; upon detecting a need for transmitting a medium access control (MAC) service data unit (SDU) in the frame, generating a buffer descriptor (BD) corresponding to constituent elements of a MAC protocol data unit (PDU); and generating the MAC PDU from the MAC SDU according to the BD.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF EXEMPLARY EMBODIMENTS

Exemplary embodiments of the present invention will now be described in detail with reference to the annexed drawings. In the following description, a detailed description of known functions and configurations incorporated herein has been omitted for clarity and conciseness.

Figure 1:
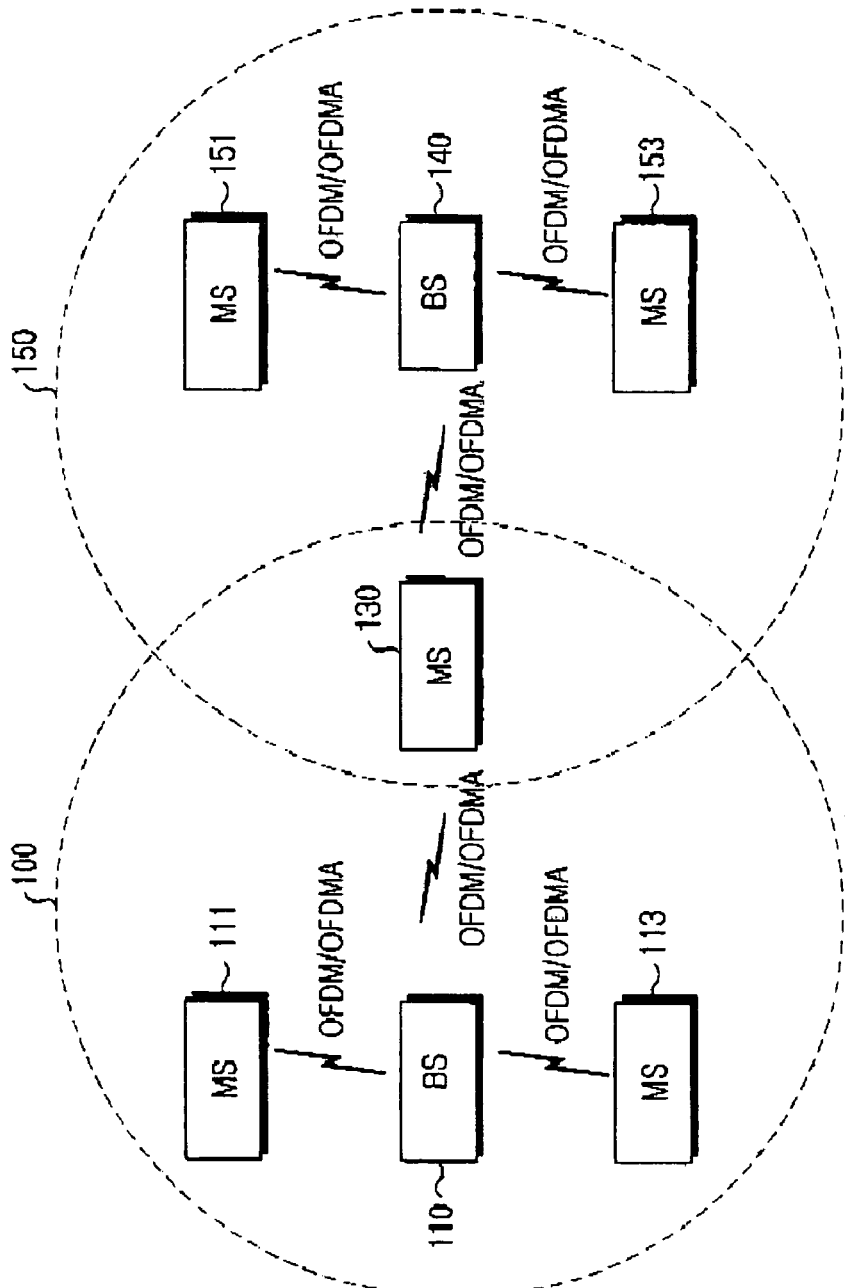
FIG. 1 is a block diagram illustrating a configuration of a conventional communication system.
Figure 2:
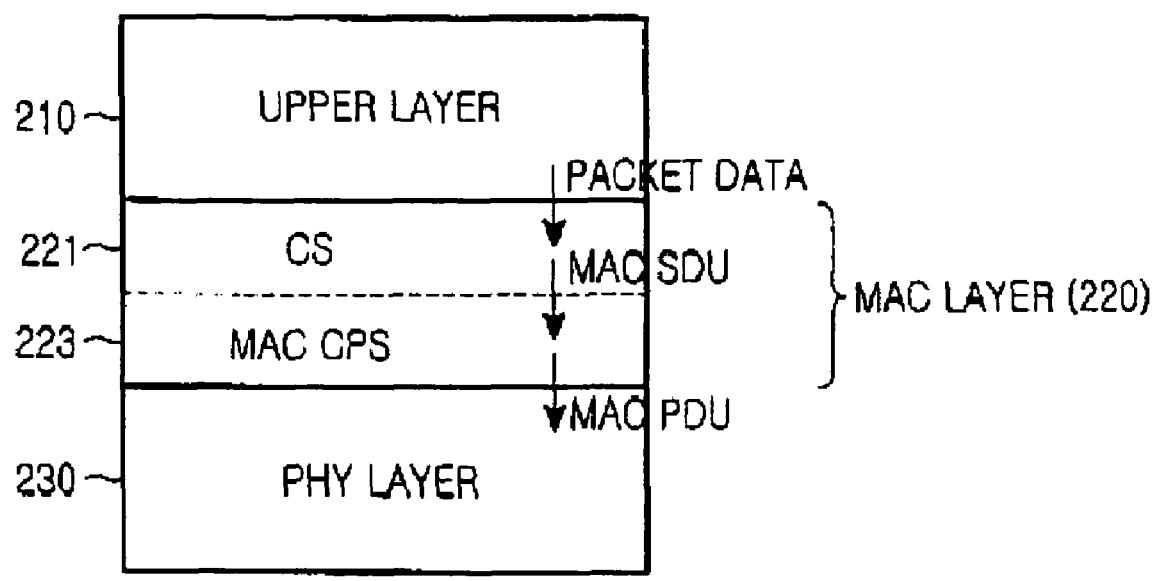
FIG. 2 is a diagram illustrating an MS protocol stack configuration for a conventional communication system.
Figure 3:
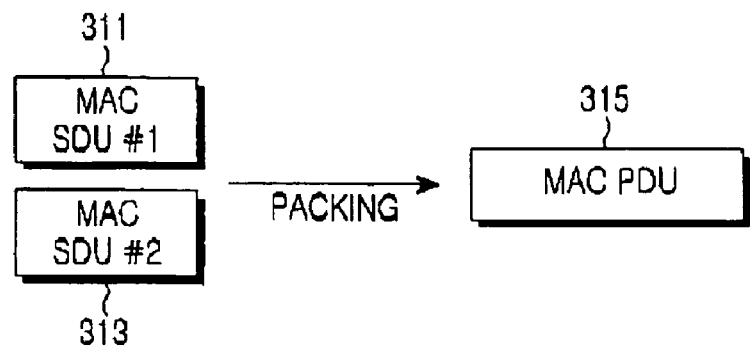
FIG. 3 is a diagram illustrating a conventional MAC SDU packing operation for generating a MAC PDU.
Figure 4:
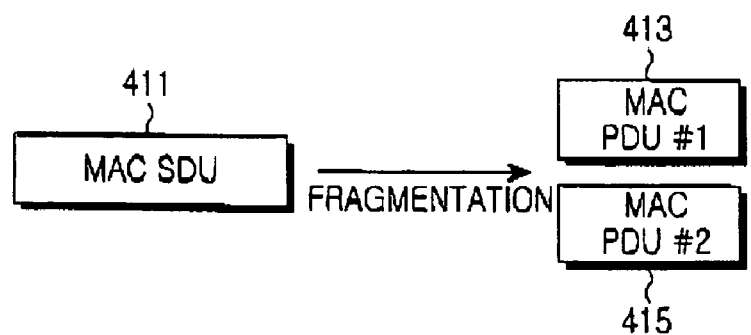
FIG. 4 is a diagram illustrating a conventional MAC SDU fragmentation operation for generating MAC PDUs.
Figure 5:
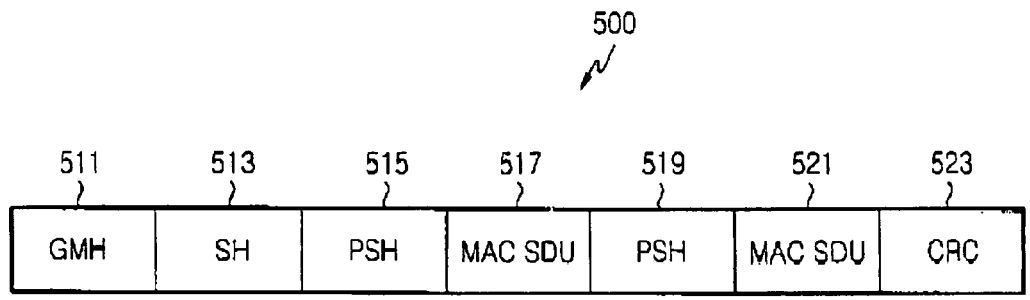
FIG. 5 is a diagram illustrating a format of a MAC PDU generated by packing multiple MAC SDUs.
Figure 6:
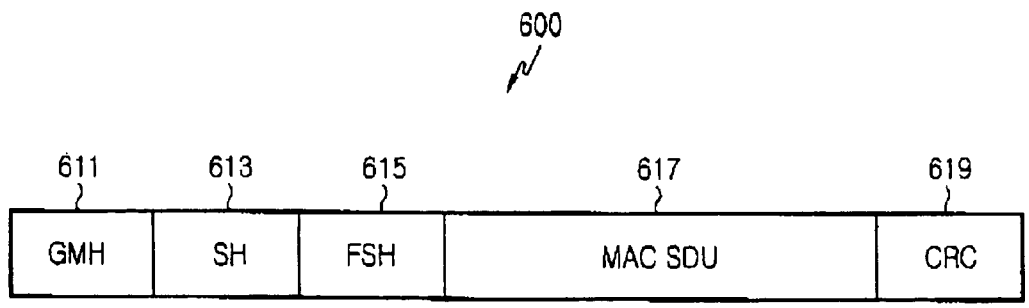
FIG. 6 is a diagram illustrating a format of a MAC PDU generated by fragmenting one MAC SDU.
Figure 7:
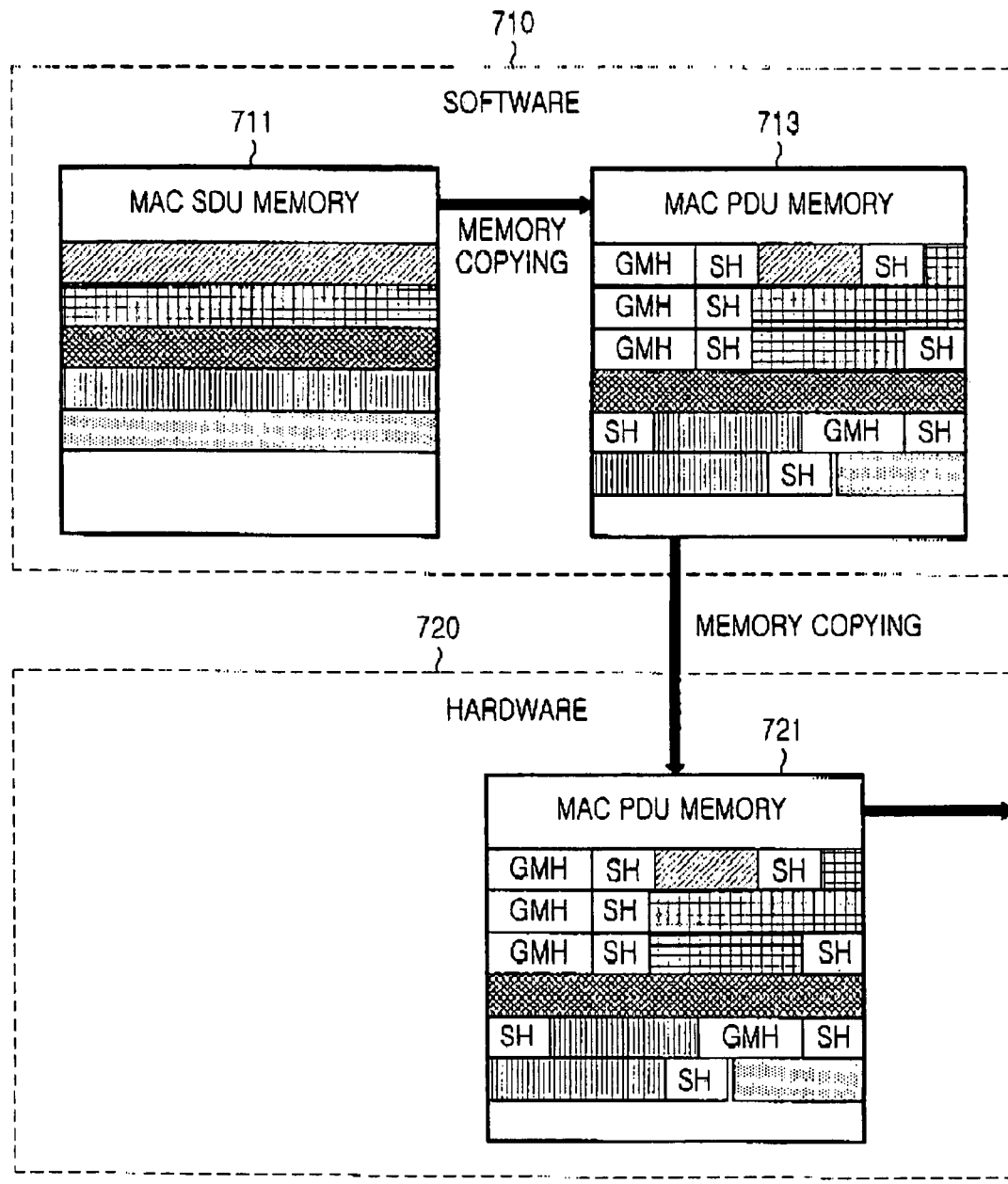
FIG. 7 is a diagram illustrating an operation of generating a MAC PDU by the MAC CPS of FIG. 2.
Figure 8:
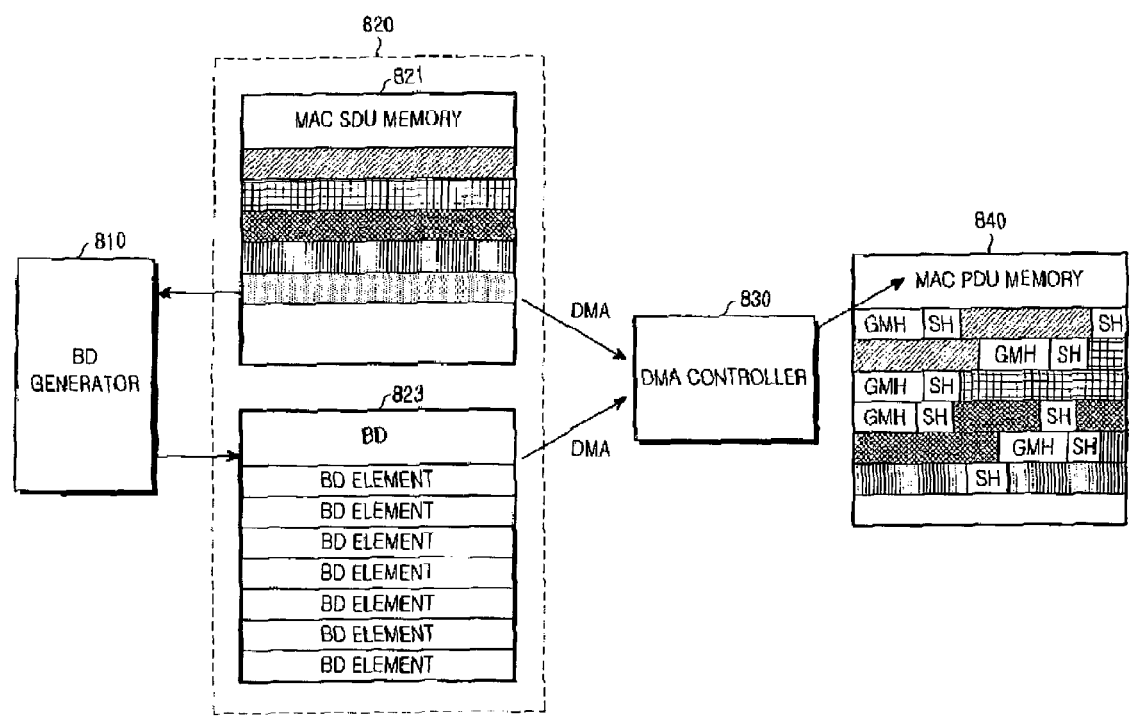
FIG. 8 is a diagram illustrating an exemplary internal structure of a MAC PDU generation apparatus according to an embodiment of the present invention.

FIG. 8 is a diagram illustrating an exemplary internal structure of a Medium Access Control (MAC) Protocol Data Unit (PDU) generation apparatus according to the present invention.

Referring to FIG. 8, the MAC PDU generation apparatus includes a buffer descriptor (BD) generator 810, a memory 820, a direct memory access (DMA) controller 830, and a MAC PDU memory 840. The memory 820 includes a MAC Service Data Unit (SDU) memory 821, and a BD 823. The memory 820 is a software memory while the MAC PDU memory 840 is a hardware memory.

The BD generator 810 generates the BD 823 corresponding to constituent elements of a MAC PDU existing in the memory 820, for example, constituent elements of a MAC PDU, such as a generic MAC header (GMH), a subheader (SH) and a MAC SDU. The BD 823 includes a plurality of BD elements. A format of the BD elements will now be described with reference to FIGS. 9, 10A and 10B.

Figure 9:
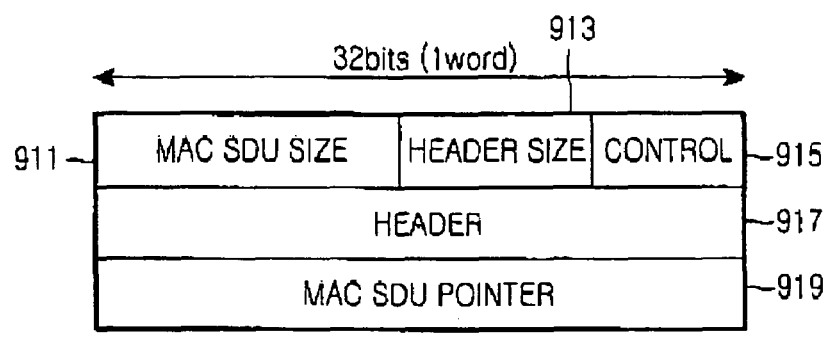
FIG. 9 is a diagram illustrating a format of a BD element having a fixed field element according to an embodiment of the present invention.

FIG. 9 is a diagram illustrating a format of a BD element having a fixed field element according to the present invention.

Referring to FIG. 9, the BD element includes a MAC SDU Size field 911, a Header Size field 913, a Control field 915, a Header field 917, and a MAC SDU pointer field 919. In the BD element, at least one of a GMH and an SH is directly included in the Header field 917 for the following reasons. Because the GMH and the SH generally have a small size of between 1 and 6 bytes, including size information and position pointer information of the GMH and the SH in the BD element to indicate positions of the GMH and the SH causes a great waste of memory capacity.

The MAC SDU Size field 911 includes size information of a MAC SDU that must be read from a MAC SDU start point in a memory, indicated by the MAC SDU pointer field 919.

The Header Size field 913 includes size information of the Header field 917, and the MAC SDU pointer field 919 includes start point information of a MAC SDU in a MAC SDU memory. The Control field 915 includes information indicating whether the BD element has a succeeding BD element or is the last BD element in the corresponding BD, and information indicating whether it is a start or an end of a MAC PDU indicated by the current BD element. The Header field 917 includes at least one of the GMH and the SH.

The detailed contents written in the BD element are shown in Table 1 below.

TABLE 1

Size field

Bit[18:16]: Header size (including both header and subheader)
Bit[31:19]: SDU size (indicating SDU size information that must be read from a SDU start point indicated by *SDU)
Control field Bit[0]: Continue(1) or end(0)
Bit[1]: Start of PDU
Bit[2]: End of PDU
Bit[3:15]: reserved
Header:

Size[18:16] value indicates a length of Header. If a length of the Header is not matched for 4-byte alignment, the remaining part is a dummy value.
SDU pointer:

It is a pointer value indicating a start point of SDU (or SDU fragmented) data, and has a length of 4 bytes.

Although the BD element shown in FIG. 9 has a fixed field element of 3 words or 4 words by way of example, a field element of the BD element is subject to change according to sizes of the fields constituting the BD element. A format of a BD element having a variable field element will now be described with reference to FIGS. 10A and 10B.

Figure 10A:
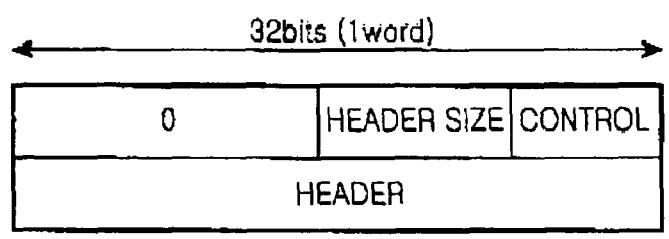
FIGS. 10A and 10B are diagrams illustrating a format of a BD element having a variable field element according to an embodiment of the present invention.
Figure 10B:
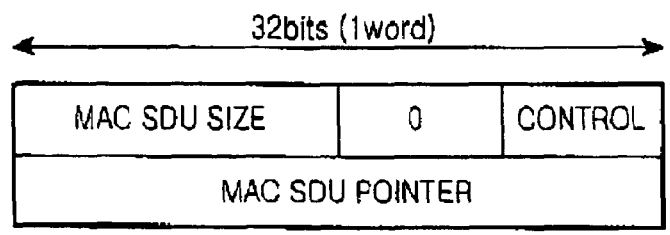

FIGS. 10A and 10B are diagrams illustrating a format of a BD element having a variable field element according to the present invention.

Before a description of FIGS. 10A and 10B is given, it is noted that the format of the BD element having a fixed field element has been described with reference to FIG. 9. However, it is possible to generate a BD element having a variable field element by omitting a particular field(s) having no information among the fields included in the BD element. For example, if a MAC SDU size is 0 indicating absence of the MAC SDU, a MAC SDU Size field 911 indicating the MAC SDU size is set to '0' in the BD element, and a MAC SDU pointer field 919 indicating a start point of the MAC SDU can be omitted. As another example, if none of a GMH and an SH is present, a Header Size field 913 is set to '0' and a Header field 917 can be omitted.

A BD format generated with a BD element having a fixed field element and a BD element having a variable field element will now be described with reference to FIGS. 12 through 13.

Figure 11:
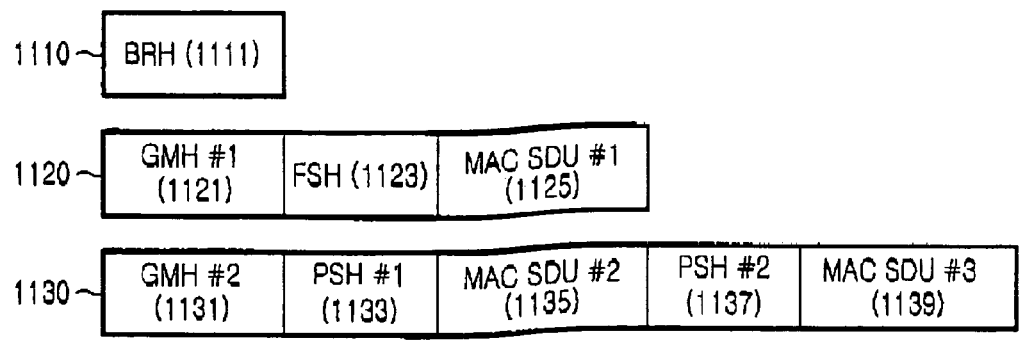
FIG. 11 is a diagram illustrating three different types of MAC PDUs.

The diagram of FIG. 11 illustrates three different types of MAC PDUs, including a MAC PDU 1110, a MAC PDU 1120 and a MAC PDU 1130. The MAC PDU 1110 includes only a bandwidth request header (BRH) 1111, the MAC PDU 1120 includes a GMH#1 1121, an FSH 1123 and a MAC SDU#1 1125, and the MAC PDU 1130 includes a GMH#2 1131, a PSH#1 1133, a MAC SDU#2 1135, a PSH#2 1137 and a MAC SDU#3 1139.

The BD formats representing the MAC PDUs, shown in FIG. 11, differ from a BD element with a fixed field element and a BD element with a variable field element, and a description thereof will now be made with reference to FIGS. 12 and 13.

Figure 12:
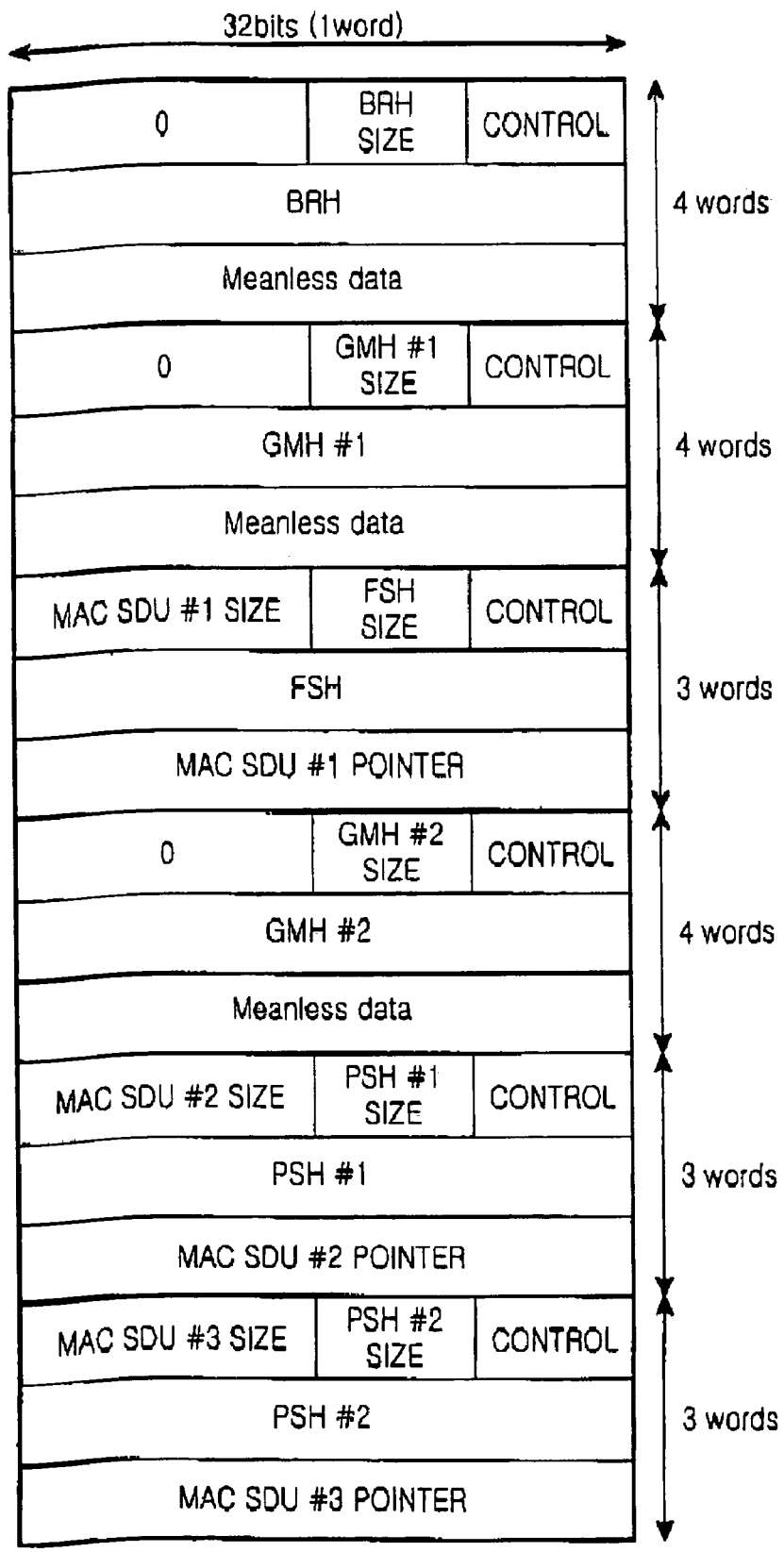
FIG. 12 is a diagram illustrating a BD format generated taking the MAC PDUs of FIG. 11 into consideration for a BD element having a fixed field element.

FIG. 12 is a diagram illustrating a BD format generated taking the MAC PDUs of FIG. 11 into consideration for a BD element having a fixed field element.

As illustrated in FIG. 12, for a BD element with a fixed field element, even the field having no information to be written therein should exist. For example, although a MAC PDU 1110 includes only a BRH 1111, a MAC SDU pointer field for the MAC PDU 1110 must exist, so that meaningless data is written in the MAC SDU pointer field.

Figure 13:
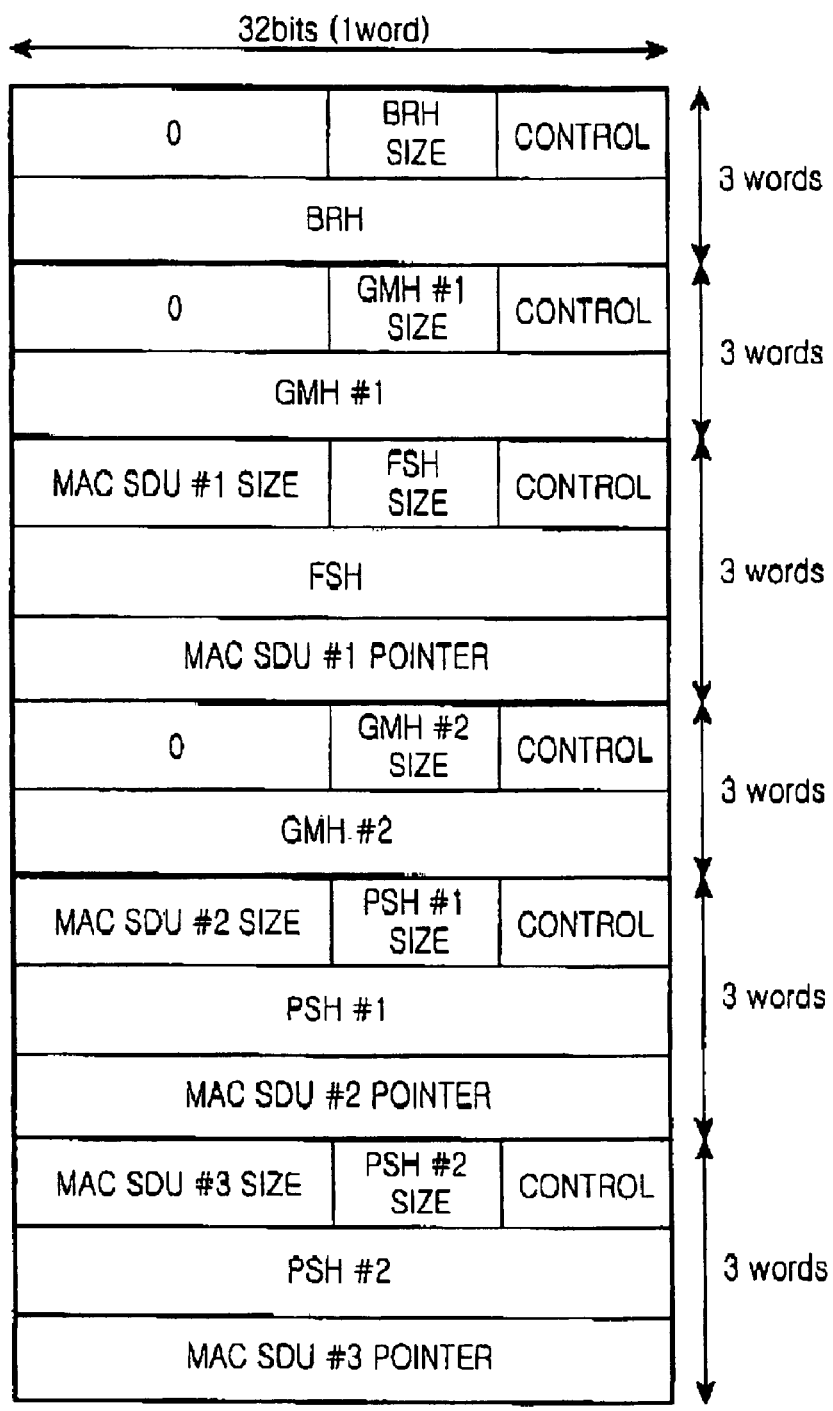
FIG. 13 is a diagram illustrating a BD format generated taking the MAC PDUs of FIG. 11 into consideration for a BD element having a variable field element.

FIG. 13 is a diagram illustrating a BD format generated taking the MAC PDUs of FIG. 11 into consideration for a BD element having a variable field element.

As illustrated in FIG. 13, for a BD element with a variable field element, a field having no information to be written therein does not necessarily need to exist. For example, because a MAC PDU 1110 includes only a BRH 1111, there is no need for a MAC SDU pointer field. As a result, the MAC SDU pointer field for the MAC PDU 1110 does not exist.

As described above, referring to FIG. 8, the BD generator 810 generates the BD 823 making reference to constituent elements of a MAC PDU in the MAC SDU memory 821. Then the DMA controller 830 generates a MAC PDU referring to the BD 823 and stores the generated MAC PDU in the MAC PDU memory 840. The DMA controller 830 generates a MAC PDU shown in the MAC PDU memory 840 using information in the fields included in the BD 823, i.e., using header information such as the GMH or the SH, and start point information and size information of a MAC SDU.

A detailed description will now be made of an operation of the DMA controller 830.

The DMA controller 830 transmits header information used for creating a MAC PDU making reference to the BD 823 as described above, and its MAC SDU to the MAC PDU memory 840. The DMA controller 830 sequentially analyzes BD elements in the BD 823. If header size information included in a Header Size field 913 of the analyzed BD element is greater than '0', the DMA controller 830 reads a Header field 917 according to the header size information, and transmits the read header information to the MAC PDU memory 840. In addition, if MAC SDU size information included in a MAC SDU Size field 911 of the analyzed BD element is greater than '0', the DMA controller 830 reads a MAC SDU depending on the corresponding MAC SDU size in a corresponding point of the MAC SDU memory 821 according to a MAC SDU start point included in a MAC SDU pointer field 919, and transmits the read MAC SDU to the MAC PDU memory 840.

The DMA controller 830 can analyze information included in a Control field 915 of the analyzed BD element and determine whether the current BD element has its succeeding BD element or is the last BD element. Alternatively, the DMA controller 830 can analyze information included in the Control field 915 of the analyzed BD element and determine whether a MAC PDU constituent element for the current BD element is a start or an end of a MAC PDU.

An operation of the DMA controller 830 for the BD element with a fixed field element has been described so far. However, an operation of the DMA controller 830 for a BD element with a variable field element is different from the operation of the DMA controller 830 for the BD element with a fixed field element.

In the case of the BD element with a variable field element, if the BD element has a field having no information to be written therein, the BD element does not include the corresponding field. As a result, the DMA controller 830 analyzes the next field without making reference to the corresponding field, and transmits the corresponding data to the MAC PDU memory 840. For example, if '0' is written in a MAC SDU Size field 911 of the BD element, the MDA controller 830 makes no reference to the MAC SDU pointer field 919.

In this manner, the MDA controller 830 can analyze all BD elements in the BD 823 and generate MAC PDUs to be transmitted to the MAC PDU memory 840.

With reference to the flowchart of FIG. 14, a description will now be made of an operation of the MAC PDU generation apparatus according to the present invention.

Figure 14:
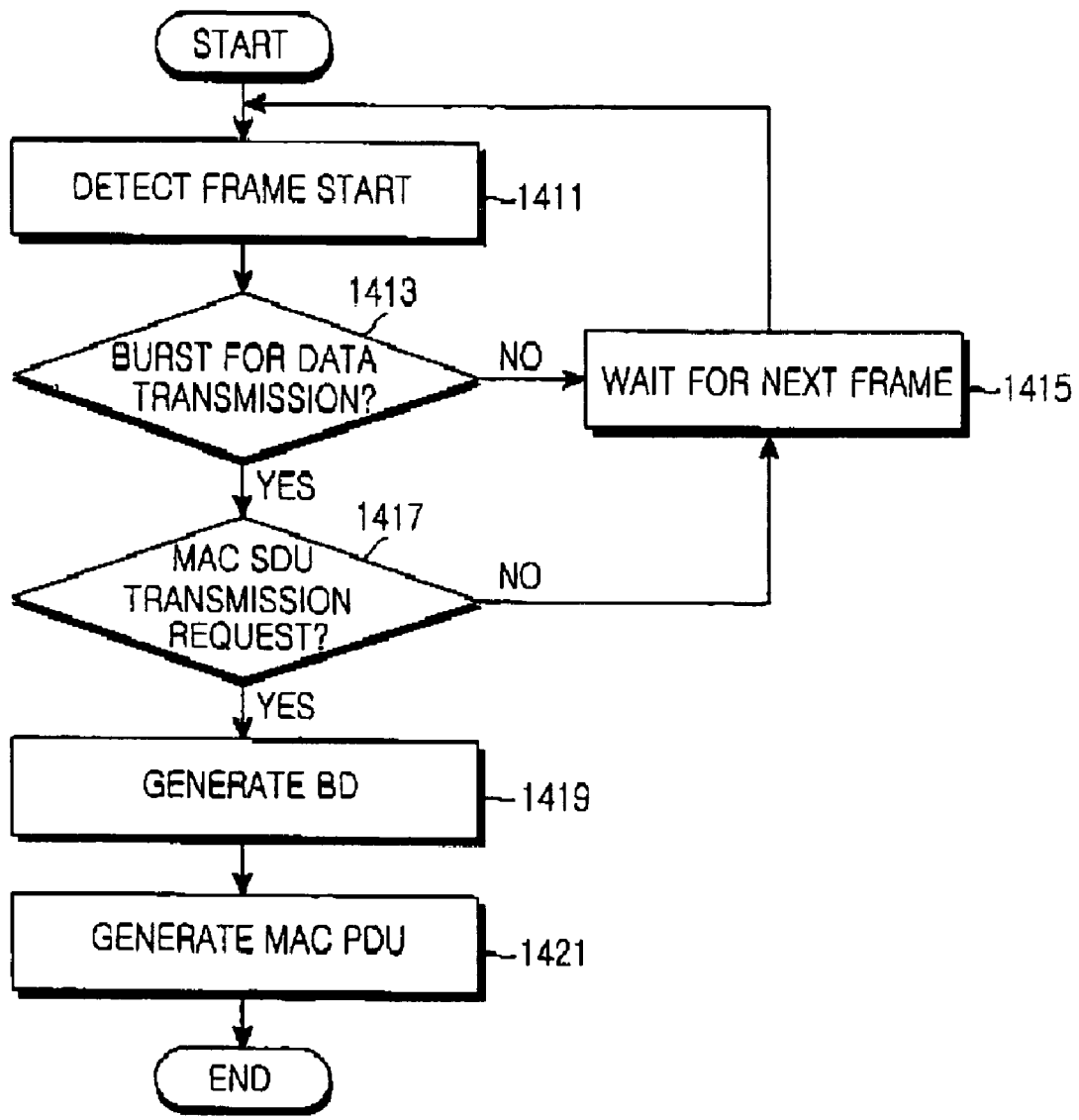
FIG. 14 is a flowchart illustrating an operation of a MAC PDU generation apparatus according to an embodiment of the present invention.

Referring to FIG. 14, the MAC PDU generation apparatus detects a start of a frame in step 1411 and then proceeds to step 1413. Herein, the MAC PDU generation apparatus detects a start of a frame because it generates a BD on a frame-by-frame basis. In step 1413, the MAC PDU generation apparatus determines if there is any allocated burst that can transmit data over the current frame. If it is determined that there is no allocated burst that can transmit data over the current frame, indicating that there is no need to generate a MAC PDU, the MAC PDU generation apparatus waits for the next frame in step 1415.

However, if it is determined in step 1413 that there is an allocated burst that can transmit data over the current frame, the MAC PDU generation apparatus determines in step 1417 whether there is any MAC SDU transmission request from a service-specific Convergence Sublayer (CS), which is a sub-layer of a MAC layer. If it is determined that there is no MAC SDU transmission request from the CS, the MAC PDU generation apparatus proceeds to step 1415.

However, if it is determined in step 1417 that there is a MAC SDU transmission request from the CS, the MAC PDU generation apparatus generates a BD making reference to MAC PDU constituent elements existing in a MAC SDU memory in step 1419. An operation of generating a BD in the MAC PDU generation apparatus has been described above, so a detailed description thereof will be omitted herein.

After completion of the BD generation operation, the MAC PDU generation apparatus generates a MAC PDU in a MAC PDU memory making reference to the generated BD in step 1421, and then ends the process.

As can be understood from the foregoing description, an embodiment of the present invention generates a MAC PDU from a MAC SDU using a BD instead of memory copying thereby to remove unnecessary memory copying in software and hardware, thus contributing to improvement in system efficiency. The removal of the unnecessary memory copying causes the minimization in time required for transmitting a MAC PDU.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting data in a communication system, the method comprising:

generating, by a buffer descriptor (BD) generator, a buffer descriptor (BD) making reference to constituent elements constituting a medium access control (MAC) protocol data unit (PDU), if there is a MAC service data unit (SDU) to be transmitted;

generating, by a direct memory access (DMA) controller, the MAC PDU from the MAC SDU according to the BD, wherein the BD includes at least one BD element, and the at least one BD element includes a MAC SDU size field, a header size field, a control field, a header field, and a MAC SDU pointer field, wherein the MAC SDU size field includes size information of the MAC SDU included in the MAC PDU, wherein the header size field includes size information of a header included in the MAC PDU, wherein the control field includes information indicating whether a corresponding BD element has its succeeding BD element, and information indicating whether the corresponding BD element is a start of the MAC PDU, and wherein the header field includes the header included in the MAC PDU.

2. The method of claim 1, wherein the MAC SDU is stored in a MAC SDU memory, the MAC PDU is stored in a MAC PDU memory, and the MAC SDU pointer field includes start point information in the MAC SDU memory for the MAC SDU included in the MAC PDU.

3. An apparatus for transmitting data in a communication system, the apparatus comprising:

a buffer descriptor (BD) generator for generating a BD making reference to constituent elements constituting a medium access control (MAC) protocol data unit (PDU), if there is MAC service data unit (SDU) first to be transmitted; and a direct memory access (DMA) controller for generating the MAC PDU from the MAC SDU according to the BD, wherein the BD includes at least one BD element, and the at least one BD element includes a MAC SDU size field, a header size field, a control field, a header field, and a MAC SDU pointer field, wherein the MAC SDU size field includes size information of the MAC SDU included in the MAC PDU, wherein the header size field includes size information of a header included in the MAC PDU, wherein the control field includes information indicating whether a corresponding BD element has its succeeding BD element, and information indicating whether the corresponding BD element is a start of the MAC PDU, and wherein the header field includes the header included in the MAC PDU.

4. The apparatus of claim 3, further comprising:

a MAC SDU memory for storing the MAC SDU; and a MAC PDU memory for storing the MAC PDU;

wherein the MAC SDU pointer field includes start point information in the MAC SDU memory for the MAC SDU included in the MAC PDU.

* * * * *